L. E. GARTLEY.
CHILD'S COASTER.
APPLICATION FILED DEC. 31, 1917.
1,268,449.
Patented June 4, 1918.
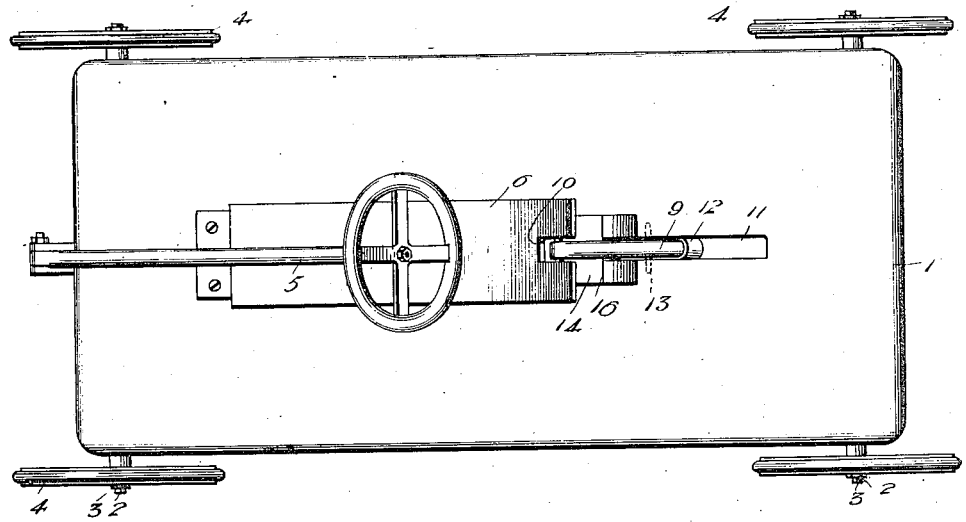
Fig. 1.
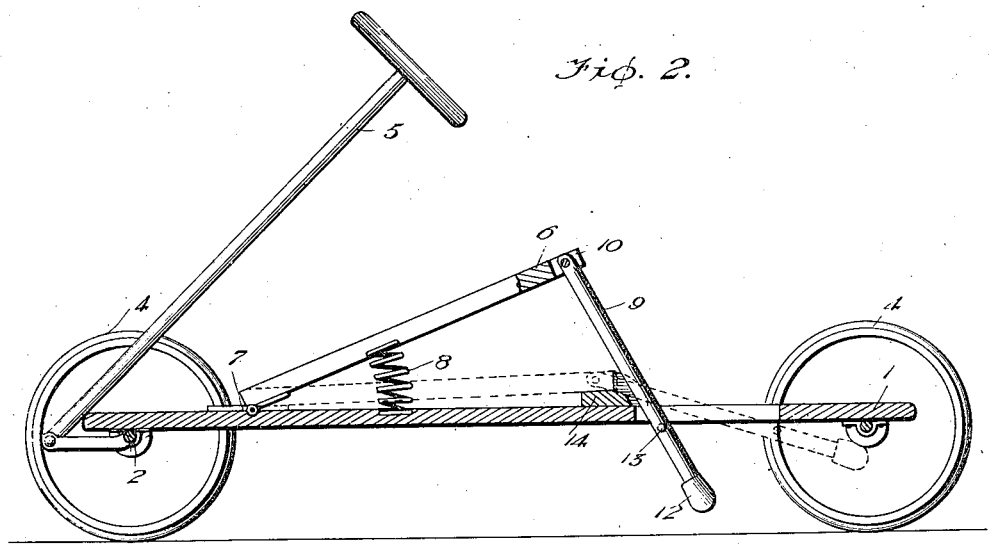
Fig. 2.
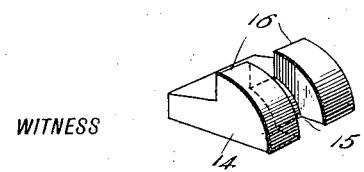
Fig. 3.
Fig. 4.
WITNESS
R. E. Rousseau
INVENTOR
Lorne E. Gartley,
BY
ATTORNEYS

UNITED STATES PATENT OFFICE.

LORNE EDWIN GARTLEY, OF COFFEYVILLE, KANSAS.

CHILD'S COASTER.

1,268,449.  Specification of Letters Patent.  Patented June 4, 1918.

Application filed December 31, 1917. Serial No. 209,705.

*To all whom it may concern:*

Be it known that I, LORNE EDWIN GARTLEY, a citizen of the United States, and a resident of Coffeyville, in the county of Montgomery and State of Kansas, have invented certain new and useful Improvements in Children's Coasters, of which the following is a specification.

My invention is an improvement in children's coasters, and has for its object to provide a device of the character specified, wherein a wheeled vehicle is provided, having means for guiding the same, and having means in connection therewith for pushing the vehicle, operated by the occupant.

In the drawings:

Figure 1 is a top plan view of the improved coaster;

Fig. 2 is a longitudinal section;

Fig. 3 is a perspective view of the stop block;

Fig. 4 is a section through the lower end of the pushing arm.

In the present embodiment of the invention, a wagon is provided, consisting of a body 1 in the form of a plate having connected therewith front and rear axles 2 and 3, upon which are mounted wheels 4. The front axle 2 is pivotally connected with the body, in such manner that it may swing from side to side, and steering mechanism, indicated generally at 5, is connected with the axle for swinging the same. All of the wheels are preferably rubber tired, as shown, in order that the device may run smoothly.

A plate 6 is hinged to the body near the front thereof, as indicated at 6, and the rear free end of this plate is normally pressed upwardly into the position shown in Fig. 2 by a coil spring 8, which is arranged between the plate 6 and the body, being seated at each end in a recess in the plate or in the body.

A staff or bar 9 is pivoted to the rear end of the plate 6, the upper end of the said staff or bar being received within the notch 10 in the rear end of the plate, and the said staff or bar extends through a longitudinally extending slot 11 in the body of the wagon. The lower end of this staff or bar has a shoe 12 of rubber or the like to prevent the lower end of the bar from slipping, under conditions to be presently described. The bar is also provided with a cross pin 13 near the shoe, for engaging across the slot, to limit the upward movement of the staff or bar and the plate 6 under the influence of the spring 8, to the position shown in Fig. 2.

A stop block 14 is secured to the body at the forward end of the slot 11, and this block is forked at its rear end, as indicated at 15. The fork registers with the slot and is adapted to receive the bar or staff. The rear end of the block is rounded, as shown more particularly in Fig. 3 and at the junction of the arms of the fork with the body of the block a transverse forwardly facing shoulder 16 is provided, the said shoulder being formed by rabbeting the block from the front end to the commencement of the notch between the arms of the fork. This shoulder is at a position such that when the plate 6 is moved downwardly the rear end of the plate will clear the shoulder, and the said rear end will move down upon the rabbeted face of the block, the rod or bar passing between the arms of the fork in such manner that the rod or bar will be made to kick the ground to propel the vehicle.

In operation, the user stands on the top of the coaster with one foot upon the plate 6 and at regular intervals depresses the same against the resistance of the spring 8. The rod or bar 9 is moved downwardly to bring the shoe 12 into contact with the ground, and as the shoe strikes the ground the vehicle will be moved forward, because of the inclination of the rod or bar. When the plate 6 strikes the block 14, a kick will be imparted to the vehicle, the rod or bar being thrown rearwardly at its lower end, to propel the vehicle forwardly.

I claim:

1. A vehicle having means for guiding the same, and provided with propelling means for engaging the ground to push the vehicle and controlled by the occupant, said propelling means comprising a plate hinged to the body of the vehicle at the forward end of the plate, a pushing bar hinged to the free end of the plate, said vehicle body having a slot through which the bar extends to engage the ground, a spring normally pressing the plate upward, and a stop block for engagement by the free end of the plate to limit the downward movement thereof and to move the bar rearwardly at its free end, said bar having at its free end a shoe of rubber.

2. A vehicle having means for guiding the same, and provided with propelling means for engaging the ground to push the vehicle and controlled by the occupant, said propelling means comprising a plate hinged to the body of the vehicle at the forward end of the plate, a pushing bar hinged to the free end of the plate, said vehicle body having a slot through which the bar extends to engage the ground, a spring normally pressing the plate upward, and a stop block for engagement by the free end of the plate to limit the downward movement thereof and to move the bar rearwardly at its free end.

3. In a vehicle, propelling means for engaging the ground to push the vehicle and controlled by the occupant, said propelling means comprising a pushing bar adapted to engage the ground at one end, a plate hinged to the body at the forward end of the plate and hinged to the pushing bar at its rear end, a spring normally pressing the plate upwardly, and a stop block for engaging the free end of the plate to limit the downward movement thereof and in position to engage the push bar to move the said bar rearwardly as the plate engages the block.

LORNE EDWIN GARTLEY.

Witnesses:
LILLIAN HOLMON,
D. H. MARTIN.